United States Patent
Yilmaz

(10) Patent No.: US 10,394,402 B2
(45) Date of Patent: *Aug. 27, 2019

(54) TOUCH SENSOR WITH EDGE-BALANCED MACRO-FEATURE DESIGN

(71) Applicant: ATMEL CORPORATION, San Jose, CA (US)

(72) Inventor: Esat Yilmaz, Santa Cruz, CA (US)

(73) Assignee: Atmel Corporation, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,143

(22) Filed: Oct. 16, 2017

(65) Prior Publication Data
US 2018/0052545 A1 Feb. 22, 2018

Related U.S. Application Data

(63) Continuation of application No. 13/851,225, filed on Mar. 27, 2013, now Pat. No. 9,791,980.

(51) Int. Cl.
*G06F 3/044* (2006.01)

(52) U.S. Cl.
CPC .................... *G06F 3/044* (2013.01)

(58) Field of Classification Search
CPC ......... G06F 3/0416; G06F 2203/04102; G06F 3/044
See application file for complete search history.

(56) References Cited

U.S. PATENT DOCUMENTS 7,663,607 B2 2/2010 Hotelling et al.
7,864,503 B2 1/2011 Chang
(Continued)

FOREIGN PATENT DOCUMENTS

CN 101882041 A 11/2010
CN 102402334 A 4/2012
(Continued)

OTHER PUBLICATIONS

Dupont Microcircuit Materials, "New Silver Conductive Inks Target High-Growth Touch Screen and OLED Markets," News & Events, DuPont Microcircuit Materials Expands Innovative Offerings for Printed Electronics, Research Triangle Park, N.C., http://www2.dupont.com/MCM/en_US/news_events/article 20100413.html, Apr. 13, 2010, 3 pages.
Cambrios Technologies Corporation, "Cambrios Technologies Corporation Awarded Department of Defense Contract for Flexible Solar Cells," http://www.cambrios.com/200/DOD_Release.htm, Apr. 20, 2010, 2 pages.

(Continued)

*Primary Examiner* — Dennis P Joseph
(74) *Attorney, Agent, or Firm* — Baker Botts L.L.P.

(57) ABSTRACT

In one embodiment, a touch position-sensing panel includes a sensing area. The sensing area includes a substrate and a plurality of first electrodes in a first layer. A first electrode of the plurality of first electrodes includes a first center region and a second electrode of the plurality of first electrodes comprises a second center region. The second electrode of the plurality of first electrodes does not include material of the first electrode of the plurality of first electrodes. A width of the second center region is less than a width of the first center region. The sensing area also includes a plurality of second electrodes in a second layer. The sensing area further includes a plurality of capacitive nodes formed by a capacitive coupling of the plurality of first electrodes in the first layer and the plurality of second electrodes in the second layer.

22 Claims, 6 Drawing Sheets

(56) References Cited

U.S. PATENT DOCUMENTS

| | | | |
|---|---|---|---|
| 7,875,814 B2 | 1/2011 | Chen et al. | |
| 7,920,129 B2 | 4/2011 | Hotelling et al. | |
| 8,031,094 B2 | 10/2011 | Hotelling et al. | |
| 8,031,174 B2 | 10/2011 | Hamblin et al. | |
| 8,040,326 B2 | 10/2011 | Hotelling et al. | |
| 8,049,732 B2 | 11/2011 | Hotelling et al. | |
| 8,179,381 B2 | 5/2012 | Frey et al. | |
| 8,217,902 B2 | 7/2012 | Chang et al. | |
| 8,723,824 B2 | 5/2014 | Myers et al. | |
| 2005/0270273 A1 | 12/2005 | Marten | |
| 2006/0097991 A1 | 5/2006 | Hotelling et al. | |
| 2008/0309635 A1 | 12/2008 | Matsu | |
| 2009/0160796 A1 | 6/2009 | Jiang et al. | |
| 2009/0194344 A1 | 8/2009 | Harley et al. | |
| 2009/0315854 A1 | 12/2009 | Matsuo | |
| 2010/0045615 A1 | 2/2010 | Gray et al. | |
| 2010/0156811 A1 | 6/2010 | Long et al. | |
| 2010/0156819 A1 | 6/2010 | Takahashi et al. | |
| 2010/0164889 A1 | 7/2010 | Hristov et al. | |
| 2010/0302201 A1 | 12/2010 | Ritter et al. | |
| 2011/0018557 A1 | 1/2011 | Badaye | |
| 2011/0095990 A1 | 4/2011 | Philipp et al. | |
| 2012/0062472 A1 | 3/2012 | Yilmaz | |
| 2012/0113014 A1 | 5/2012 | Yilmaz | |
| 2012/0242588 A1 | 9/2012 | Myers et al. | |
| 2012/0242592 A1 | 9/2012 | Rothkopf et al. | |
| 2012/0243151 A1 | 9/2012 | Lynch | |
| 2012/0243719 A1 | 9/2012 | Franklin et al. | |
| 2013/0076612 A1 | 3/2013 | Myers | |
| 2013/0154995 A1 | 6/2013 | Trend et al. | |
| 2014/0218335 A1* | 8/2014 | Teranishi | G06F 3/044 345/174 |

FOREIGN PATENT DOCUMENTS

| | | |
|---|---|---|
| CN | 202422087 U | 9/2012 |
| CN | 102819364 A | 12/2012 |
| CN | 102841719 A | 12/2012 |
| DE | 202012101480 U1 | 5/2012 |
| WO | 2012129247 A2 | 9/2012 |

OTHER PUBLICATIONS

Horteis, M. et al., "Fine Line Printed and Plated Contacts on High Ohmic Emitters Enabling 20% Cell Efficiency," Photovoltaic Specialist Conference (PVSC), 2009 34th IEEE, Jun. 7-12, 2009, pp. 000060-000065.

Core Applications & Technologies, "Printing of Antennas and Flexible Circuits," Conductive InkJet Technology Technology Ltd., Oct. 2009, 23 pages.

Latest News, Conductive InkJet Technology, Printed from Website: http://www.conductiveinkjet.com/about-us/latest-news/2009.aspx on Apr. 20, 2010.

Yilmaz, E., Non-Final Rejection, U.S. Appl. No. 12/880,836, dated Jan. 14, 2014, 16 pages.

Yilmaz, E., Amendment after Non-Final Rejection, U.S. Appl. No. 12/880,836, dated Apr. 14, 2014, 14 pages.

Yilmaz, E., Final Rejection, U.S. Appl. No. 12/880,836, dated Jul. 18, 2014, 21 pages.

Yilmaz, E., Response to Final Rejection, U.S. Appl. No. 12/880,836, dated Oct. 20, 2014, 17 pages.

Yilmaz, E., U.S. Appl. No. 12/880,836, filed Sep. 13, 2010, 47 pages.

Yilmaz, E., Advisory Action and Applicant Initiated Interview Summary, U.S. Appl. No. 12/880,836, dated Nov. 6, 2014, 7 pages.

Yilmaz, E., RCE and Amendment, U.S. Appl. No. 12/880,836, filed Jan. 16, 2015, 14 pages.

Yilmaz, E., Examiner-Initiated Interview Summary, U.S. Appl. No. 12/880,836, dated Jan. 26, 2015, 8 pages.

Yilmaz, E., Response to Examiner Interview Summary, U.S. Appl. No. 12/880,836, dated Feb. 26, 2015, 2 pages.

Yilmaz, E., Amendment after Non-Final Rejection, U.S. Appl. No. 12/880,836, dated Sep. 8, 2015, 13 pages.

Rothkopf, F. R. et al., U.S. Appl. No. 61/454,894, filed Mar. 21, 2011, 41 pages.

Myers, S. A. et al., U.S. Appl. No. 61/454,936, filed Mar. 21, 2011, 23 pages.

Lynch, S. B., U.S. Appl. No. 61/454,950, filed Mar. 21, 2011, 28 pages.

Yilmaz, E., Non-Final Rejection, U.S. Appl. No. 12/880,836, dated May 7, 2015, 17 pages.

Yilmaz, E., Notice of Allowance, U.S. Appl. No. 12/880,836, dated Sep. 25, 2015, 7 pages.

Taiwan Office Action of the Intellectual Property Office, Application No. 103100850, dated Feb. 17, 2017, 6 pages Yilmaz, E., Non-Final Rejection, U.S. Appl. No. 13/851,225, dated Feb. 6, 2014, 19 pages.

Yilmaz, E., Amendment after Non-Final Rejection, U.S. Appl. No. 13/851,225, dated Apr. 6, 2015, 16 pages.

Yilmaz, E., Final Rejection, U.S. Appl. No. 13/851,225, dated May 15, 2014, 20 pages.

Yilmaz, E., RCE and Amendment, U.S. Appl. No. 13/851,225, filed Aug. 15, 2014, 13 pages.

Yilmaz, E., Non-Final Rejection, U.S. Appl. No. 13/851,225, dated Dec. 5, 2014, 20 pages.

Yilmaz, E., Final Rejection, U.S. Appl. No. 13/851,225, dated Apr. 21, 2015, 21 pages.

Yilmaz, E., RCE and Amendment, U.S. Appl. No. 13/851,225, filed Sep. 21, 2015, 20 pages.

Yilmaz, E., Non-Final Rejection, U.S. Appl. No. 13/851,225, dated Dec. 7, 2015, 28 pages.

Yilmaz, E., Amendment after Non-Final Rejection, U.S. Appl. No. 13/851,225, dated Apr. 7, 2016, 16 pages.

Yilmaz, E., Final Rejection, U.S. Appl. No. 13/851,225, dated Apr. 27, 2016, 29 pages.

Yilmaz, E., Response to Final Rejection, U.S. Appl. No. 13/851,225, dated Jul. 27, 2016, 17 pages.

Yilmaz, E., Non-Final Rejection, U.S. Appl. No. 13/851,225, dated Sep. 28, 2016, 29 pages.

Yilmaz, E., Amendment after Non-Final Rejection, U.S. Appl. No. 13/851,225, dated Dec. 28, 2016, 16 pages.

Yilmaz, E., Final Rejection, U.S. Appl. No. 13/851,225, dated Feb. 1, 2017, 29 pages.

Yilmaz, E., Response to Final Rejection, U.S. Appl. No. 13/851,225, dated Apr. 11, 2017, 19 pages.

Yilmaz, E., Advisory Action, U.S. Appl. No. 13/851,225, dated Apr. 24, 2017, 3 pages.

Yilmaz, E., Notice of Allowance, U.S. Appl. No. 13/851,225, dated Jun. 20, 2017, 11 pages.

Yilmaz, E., Amendment after Non-Final Rejection, U.S. Appl. No. 13/851,225, dated May 6, 2014, 16 pages.

Chinese Patent Office, Second Office Action, Application No. 201410015463.05, dated Jul. 4, 2018, 27 pages. (with translation).

Chinese First Office Action and Search Report, Application No. 201410015463.5, Issued by State Intellectual Property Office (with translation), dated Nov. 3, 2017, 23 pages.

Chinese Rejection Decision, Application No. 201410015463.5, Issued by State Intellectual Property Office (with translation), dated Jan. 11, 2019, 26 pages.

* cited by examiner

TOUCH SENSOR WITH EDGE-BALANCED MACRO-FEATURE DESIGN

RELATED APPLICATION

This application is a continuation under 35 U.S.C. § 120 of U.S. application Ser. No. 13/851,225, filed Mar. 27, 2013 and entitled Touch Sensor With Edge-Balanced Macro-Feature Design, incorporated herein by reference.

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
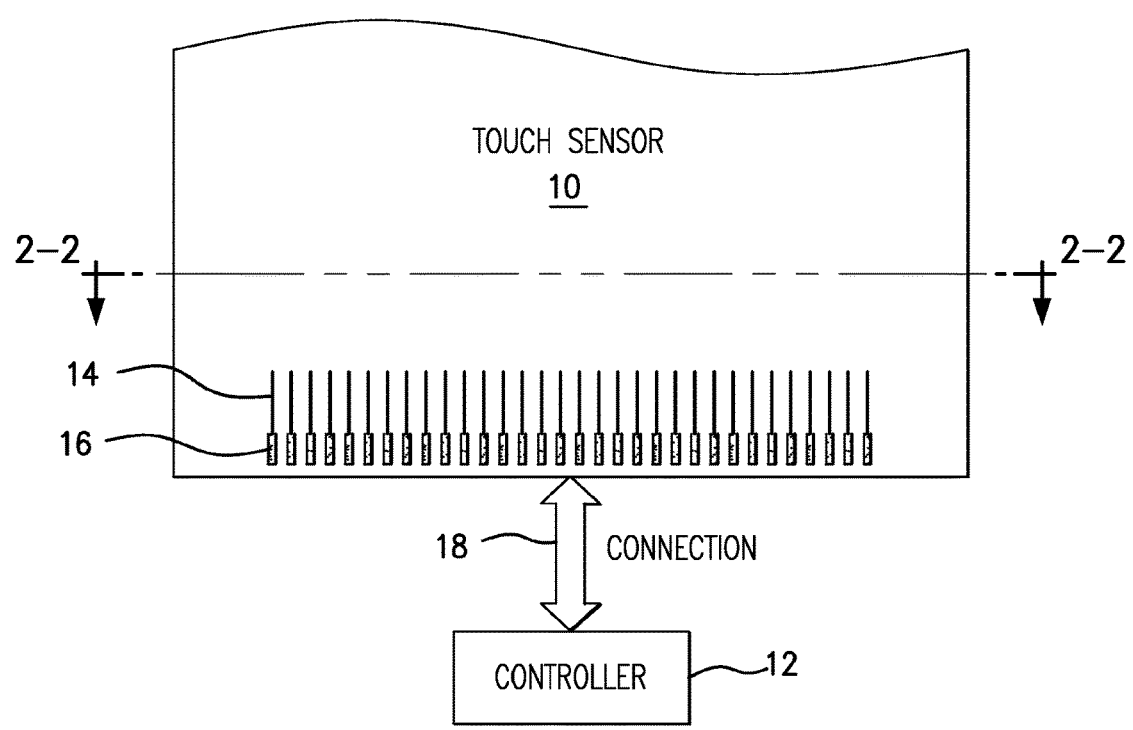
FIG. 1 illustrates a touch sensor and touch sensor controller in accordance with particular embodiments.

FIG. 1 illustrates a touch sensor and touch sensor controller in accordance with particular embodiments. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the controller and its touch sensor, where appropriate. Touch sensor 10 may include one or more touch-sensitive areas, where appropriate. Touch sensor 10 may include an array of drive and sense electrodes (for example, electrodes 102 and 103 in FIGS. 2 through 4A, 4B, and 4C) or an array of electrodes of a single type disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, quadrilateral, other suitable shape, or suitable combination of these shapes. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% (such as for example, approximately 5%) of the area of its shape. As an example and not by way of limitation, an electrode may be made of fine lines of metal or other conductive material (such as for example copper, silver, or a copper- or silver-based material) and the fine lines of conductive material may occupy substantially less than 100% (such as for example, approximately 5%) of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more macro-features of a touch sensor may determine one or more characteristics of its functionality. One or more characteristics of the implementation of those shapes (such as, for example, the conductive materials, fills, or patterns within the shapes) may constitute in whole or in part one or more micro-features of the touch sensor. One or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of optically clear adhesive may be disposed between the cover panel and the substrate with the conductive material forming the drive or sense electrodes. The mechanical stack may also include a second layer of optically clear adhesive and a dielectric layer (which may be made of PET or another suitable material, similar to the substrate with the conductive material forming the drive or sense electrodes). As an alternative, where appropriate, a thin coating of a dielectric material may be applied instead of the second layer of optically clear adhesive and the dielectric layer. The second layer of optically clear adhesive may be disposed between the substrate with the conductive material making up the drive or sense electrodes and the dielectric layer, and the dielectric layer may be disposed between the second layer of optically clear adhesive and an air gap to a display of a device including touch sensor 10 and touch-sensor controller 12. As an example only and not by way of limitation, the cover panel may have a thickness of approximately 1 mm; the first layer of optically clear adhesive may have a thickness of approximately 0.05 mm; the substrate with the conductive material forming the drive or sense electrodes may have a thickness of approximately 0.05 mm; the second layer of optically clear adhesive may have a thickness of approximately 0.05 min; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of optically clear adhesive, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) or digital signal processors (DSPs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs)—such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. In particular embodiments, multiple touch-sensor controllers 12 are disposed on the FPC. In some embodiments, the FPC may have no touch-sensor controllers 12 disposed on it. The FPC may couple touch sensor 10 to a touch-sensor controller 12 located elsewhere, such as for example, on a printed circuit board of the device. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

In particular embodiments, touch sensor 10 may have a multi-layer configuration, with drive electrodes disposed in a pattern on one side of a substrate and sense electrodes disposed in a pattern on another side of the substrate. In such a configuration, a pair of drive and sense electrodes capacitively couple to each other at the intersection of a drive electrode and sense electrode. In particular embodiments, a multi-layer configuration of drive and sense electrodes may satisfy certain space and/or shape constraints with respect to the construction of touch sensor 10. Particular embodiments and examples of multi-layer configurations of drive and sense electrodes will be discussed further with respect to FIGS. 2 through 4A, 4B, and 4C.

Figure 2:
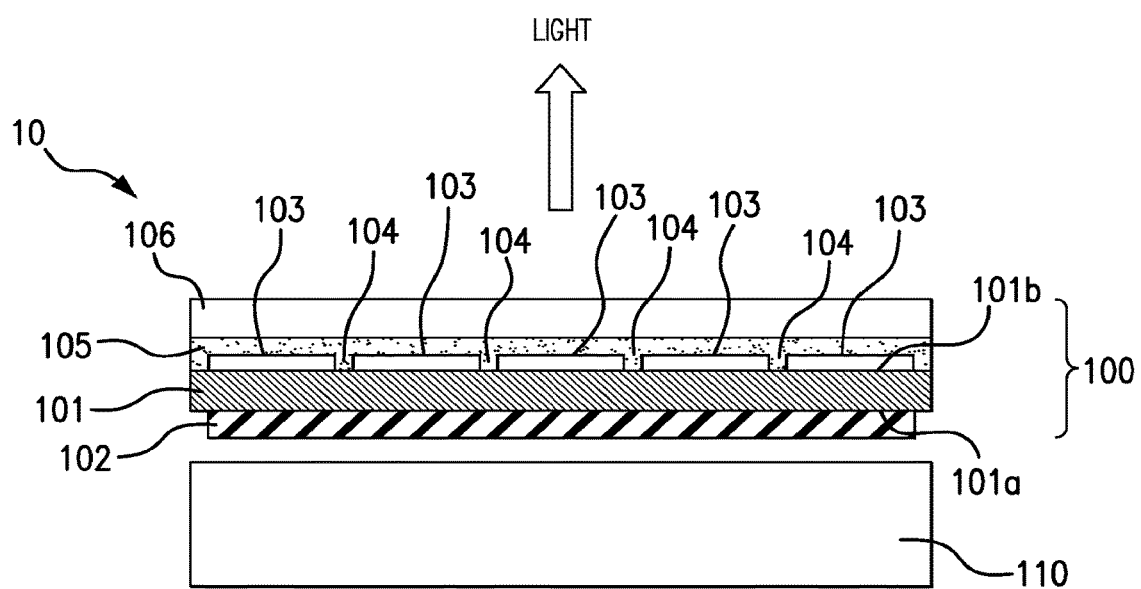
FIG. 2 illustrates a cross section of a touch sensor along the line 2-2 in accordance with particular embodiments.

FIG. 2 illustrates a cross section of touch sensor 10 along lines 2-2 in accordance with particular embodiments. Touch sensor 10 comprises a mechanical stack 100 and a display 110. Mechanical stack 100, which overlays display 110, includes a substrate 101, a drive electrode 102, a plurality of sense electrodes 103, a plurality of gaps 104, an optically clear adhesive 105, and a cover panel 106.

Substrate 101 has a plurality of surfaces, including a first surface 101a facing display 110 and a second surface 101b facing cover panel 106. Substrate 101 may be formed from a transparent, non-conductive material such as glass or a plastic as discussed in conjunction with FIG. 1. Drive electrode 102 is located on first surface 101a of substrate 101, such that drive electrode 102 is located between substrate 101 and display 110. In various embodiments, there may be an air gap between drive electrode 102 and display 110. This cross sectional view provides a view of the length of one drive electrode, drive electrode 102. In a particular embodiment, a plurality of drive electrodes 102 may be located between substrate 101 and display 110, with lengths running generally parallel to drive electrode 102. Each of a plurality of drive electrodes 102 may be separated from one or more adjacent drive electrode by a cut in the conductive material, or a gap. A gap between adjacent drive electrodes may be as narrow as possible to reduce visibility of the cuts. In some embodiments, a gap between drive electrodes may have a width of approximately 100 μm to 5 μm, and in particular embodiments the width may be approximately 10 μm. Drive electrodes may be formed from any suitable material, including conductive mesh and ITO, as discussed in conjunction with FIG. 1.

Sense electrodes 103 are located on second surface 101b of substrate 101, such that sense electrodes 103 are located between substrate 101 and cover panel 106. Each sense electrode 103 is separated from adjacent sense electrodes 103 by gaps 104. Gaps 104 are cuts in the lines of conductive material, such as copper, and may be as narrow as possible. In various embodiments, gaps 104 may have a width of approximately 100 μm to 5 μm, and in particular embodiments the width may be approximately 10 μm. This cross sectional view provides a view of the widths of sense electrodes 103. In certain embodiments, the widths of a touch sensor's sense electrodes may be shorter or longer than sense electrodes 103 as illustrated. In various embodiments, the widths of sense electrodes may be generally the same for all sense electrodes or may vary for each sense electrode 103. Further, in certain embodiments, there may be a greater or fewer number of sense electrodes that illustrated herein. Sense electrodes 103 may be formed from any suitable material, including conductive mesh and ITO, as discussed in conjunction with FIG. 1. Sense electrodes 103 may form patterns that are interpolated. For example, two adjacent sense electrodes 103 may form a pattern in which each electrode has side portions which cover the same stripe-shaped region of a panel, such as a sensing region. Each electrode may cover a portion of the stripe-shaped region, alternating coverage between one electrode and the other along a length of the side regions in an interleaved manner. In some examples, adjacent sense electrodes 103 have side portions that each cover approximately half of the side regions. In certain embodiments, any proportion of the side regions may be encompassed within the electrode.

Although, as illustrated, drive electrode 102 and sense electrodes 103 do not make electrical contact, they may capacitively couple to create capacitive nodes. Capacitive nodes may be identified based on their location within touch sensor 10. For example, a capacitive node located in a corner of touch sensor 10 may be identified as a corner node, a capacitive node located along an edge of touch sensor 10 may be identified as an edge node, and a capacitive node located away from edges and corners of touch sensor 10 may be identified as a center node.

Cover panel 106 is attached to sense electrodes 103 with optically clear adhesive 105. Cover panel 106 may be clear and made of a resilient material as discussed in conjunction with FIG. 1. As illustrated, light generated by display 110 passes through mechanical stack 100 and is visible to a user of touch sensor 10 through cover panel 106.

In certain embodiments, there may be additional components not illustrated herein. For example, adhesive may used between various layers within mechanical stack 100 or between mechanical stack 100 and display 110. Certain embodiments may include a second substrate and, in certain circumstances, sense electrodes may be attached to the first substrate and drive electrodes may be attached to the second substrate.

Figure 3A:
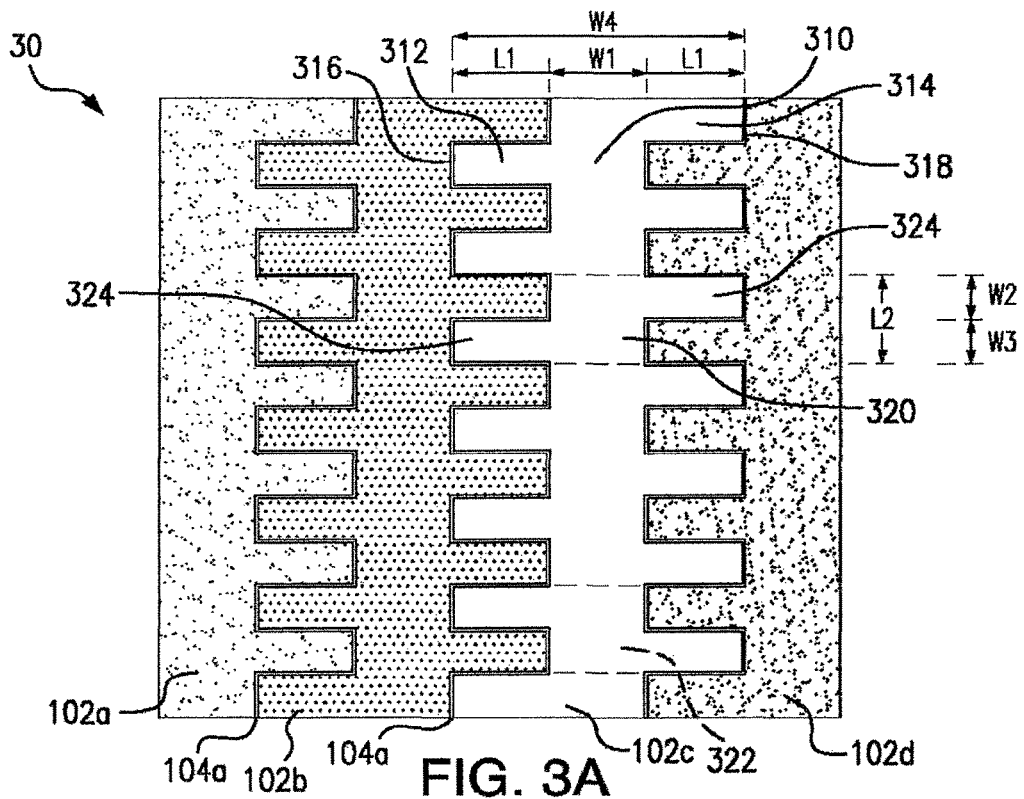
FIGS. 3A, 3B, and 3C illustrate an arrangement of sense and drive electrodes in accordance with a conventional approach.
Figure 3B:
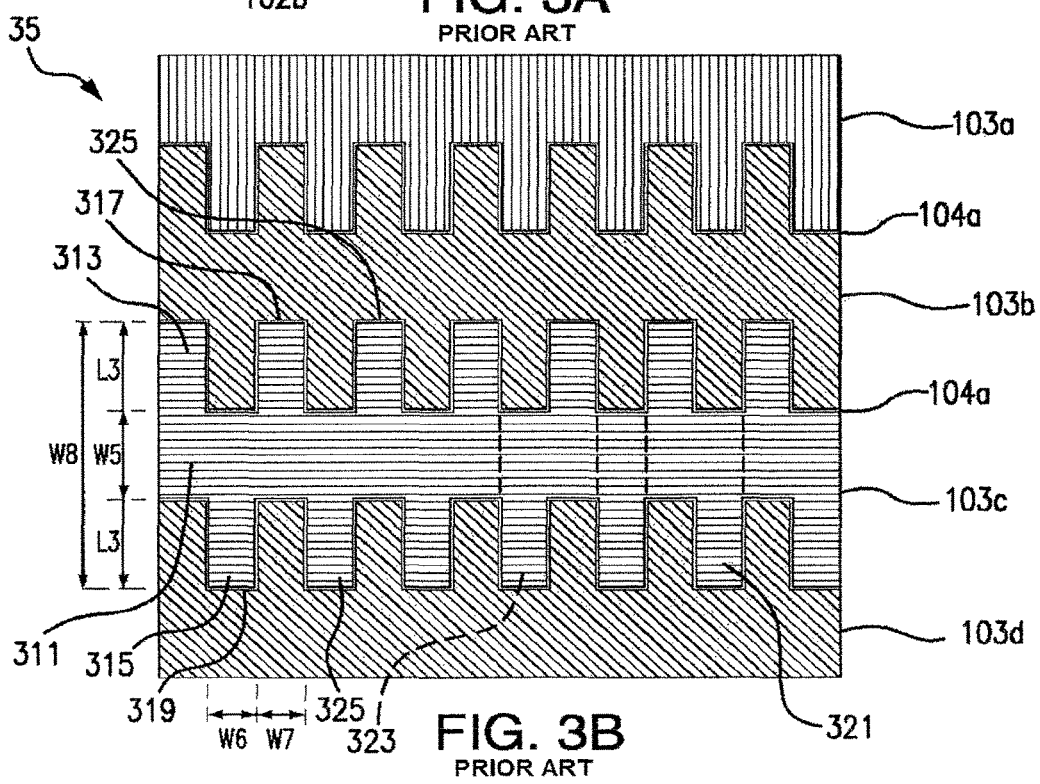
Figure 3C:
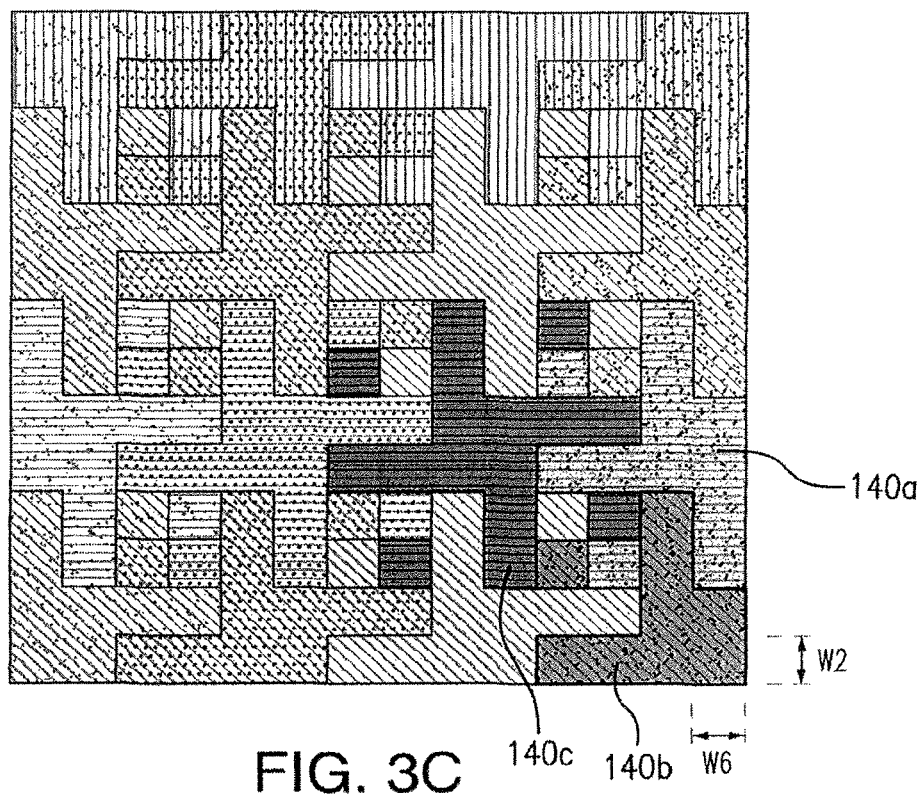

FIGS. 3A, 3B, and 3C illustrate an arrangement of sense and drive electrodes in accordance with a conventional approach. FIG. 3A illustrates a drive electrode layer 30 with a particular pattern of drive electrodes that could be used in touch sensor 10 as illustrated in FIG. 1. Drive electrode layer 30 includes drive electrodes 102a, 102b, 102c, and 102d.

Drive electrode 102c comprises a center region 310, two side regions 312 and 314, two outer boundaries 316 and 318, a repeating shape element 320, and a plurality of rectangular arms 324. Side region 312 runs along one side of center region 310 and side region 314 runs along the opposite side of center region 310. Both run parallel to each other and center region 310.

Each side region 312 and 314 have rectangular arms 324 extending from center region 310 with a length L1. Length L1 is approximately equal to a width W1 of center region 310 of drive electrode 102c. Each rectangular arm 324 is separated from an adjacent rectangular arm 324 in side regions 312 and 314, respectively, by a rectangular space. In this embodiment, a width W2 of each rectangular arm 324 is approximately the same as a width W3 of each rectangular space, such that approximately half of the total area of each side region 312 and 314 is encompassed within the area of drive electrode 102c. Rectangular arms 324 are formed in an alternating fashion such that a rectangular arm in side region 312 is not in the same row as a rectangular arm is side region 314. In certain embodiments, rectangular arms 324 may be formed such that a rectangular arm in side region 312 is in the same row as a rectangular arm in side region 314. In particular embodiments, arms 324 may be rectangular, square, have curved edges, or may be of any suitable shape. In various embodiments, a rectangular arm may be referred to as a digit.

The shape of drive electrode 102c is made up of a plurality of repeated shape elements 320. Each shape element 320 has one conductive rectangular arm 324 in each side region 312 and 314 and these rectangular arms 324 are linked by a section of center region 310. The ends of a single shape element 320 are illustrated by dashed lines in FIG. 3A. Each shape element 320 has a length L2, which is approximately equal to twice the width of a rectangular arm 324, or approximately twice width W2. The length L2 is the repeat length of the drive electrode pattern. Each shape element 320 has a width W4, which is approximately equal to the total width of center region 310 and both side regions 312 and 314, or approximately thrice length L1 or thrice width W1. Width W4 is approximately equal to the distance between edges 316 and 318 of drive electrode 102c. In this embodiment, drive electrode 102c includes seven repeating shape elements 320 in drive electrode layer 30. In certain embodiments, drive electrode 102c may be formed by repeating shape elements 322, which are opposite handed compared to shape elements 320.

Drive electrodes 102a and 102b have shapes similar to drive electrode 102c with similar dimensions. Drive electrode 102d also has similar shapes and similar dimensions in its center region 310 and side region 312. Drive electrode 102d is on the right hand side of drive electrode layer 30. Therefore, drive electrode 102d does not have a side region 314 with rectangular arms. In various embodiments, drive electrodes located near edges of touch sensor 10 may only include one side region.

Rectangular arms 324 in side region 312 of drive electrode 102c are interpolated with rectangular arms of drive electrode 102b, such that space between rectangular arms 324 in side region 312 is generally filled by rectangular arms of drive electrode 102b. Interpolated drive electrodes 102b and 102c are electrically isolated from each other by one of a plurality of gaps 104a, where each gap 104a is a cut in the lines of conductive material, such as copper, that comprise drive electrodes 102a, 102b, 102c, and 102d. Rectangular arms 324 in side region 314 of drive electrode 102c are interpolated with rectangular arms of drive electrode 102d, such that space between rectangular arms 324 in side region 314 is generally filled by rectangular arms of drive electrode 102d. Interpolated drive electrodes 102c and 102d are electrically isolated from each by another gap 104a. The patterns of side regions of adjacent drive electrodes may be complimentary in this way, such that the approximately 100% of the area of a side region may be encompassed within adjacent drive electrodes, excepting the area of gaps 104a. In various embodiments, some or all drive electrodes in drive electrode layer 30 may be interpolated with one or more adjacent drive electrodes. In certain embodiments, touch sensor 10 may include any suitable number of drive electrodes for its shape and size.

FIG. 3B illustrates a sense electrode layer 35 with a particular pattern of sense electrodes that could be used in touch sensor 10 as illustrated in FIG. 1. Sense electrode layer 35 includes sense electrodes 103a, 103b, 103c, and 103d.

Sense electrode 103c comprises a center region 311, two side regions 313 and 315, two outer boundaries 317 and 319, a repeating shape element 321, and a plurality of rectangular arms 325. Side region 313 runs along one side of center region 311 and side region 315 runs along the opposite side of center region 311. Both run parallel to each other and center region 311.

Each side region 313 and 315 have rectangular arms 325 extending from center region 311 with a length L3. Length L3 is approximately equal to a width W5 of center region 311 of sense electrode 103c. In various embodiments, width W5 may be approximately equal to width W1 of center region 310 of drive electrode 102c. Each rectangular arm 325 is separated from an adjacent rectangular arm 325 in side regions 313 and 315, respectively, by a rectangular space. In this embodiment, a width W6 of each rectangular arm 325 is approximately the same as a width W7 of each rectangular space, such that approximately half of the total area of each side region 313 and 315 is encompassed with the area of sense electrode 103c. In various embodiments, width W6 may be approximately equal to width W2 of each rectangular arm 324 of drive electrode 102c. Rectangular arms 325 are formed in an alternating fashion such that a rectangular arm in side region 313 is not in the same row as a rectangular arm is side region 315. In certain embodiments, rectangular arms 325 may be formed such that a rectangular arm in side region 313 is in the same row as a rectangular arm in side region 315. In particular embodiments, arms 325 may be rectangular, square, have curved edges, or may be of any suitable shape. In various embodiments, a rectangular arm may be referred to as a digit.

The shape of sense electrode 103c is made up of a plurality of repeated shape elements 321. Each shape element 321 has one conductive rectangular arm 325 in each side region 313 and 315 and these rectangular arms 325 are linked by a section of center region 311. The ends of a single shape element 321 are illustrated by dashed lines in FIG. 3B. Each shape element 321 has a length L4, which is approximately equal to twice the width of a rectangular arm 325, or approximately twice width W6. The length L4 is the repeat length of the sense electrode pattern. Each shape element 321 has a width W8, which is approximately equal to the total width of center region 311 and both side regions 313 and 315, or approximately thrice length L3 or thrice width W5. Width W8 is approximately equal to the distance between edges 317 and 319 of sense electrode 103c. In this embodiment, sense electrode 103c includes seven repeating shape elements 321 in sense electrode layer 35. In certain embodiments, sense electrode 103c may be formed by repeating shape elements 323, which are opposite handed compared to shape elements 321.

Sense electrodes 103a and 103b have shapes similar to sense electrode 103c with similar dimensions. Sense electrode 103d also has similar shapes and similar dimensions in its center region 311 and side region 313. Sense electrode 103d is on the bottom side of sense electrode layer 35. Therefore, sense electrode 103d does not have a side region 315 with rectangular arms. In various embodiments, sense electrodes located near edges of touch sensor 10 may only include one side region.

Rectangular arms 325 in side region 313 of sense electrode 103c are interpolated with rectangular arms of sense electrode 103b, such that space between rectangular arms 325 in side region 313 is generally filled by rectangular arms of sense electrode 103b. Interpolated sense electrodes 103b and 103c are electrically isolated from each other by one of a plurality of gaps 104a, where each gap 104a is a cut in the lines of conductive material, such as copper, that comprise sense electrodes 103a, 103b, 103c, and 103d. Rectangular arms 325 in side region 315 of sense electrode 103c are interpolated with rectangular arms of sense electrode 103d, such that space between rectangular arms 325 in side region 315 is generally filled by rectangular arms of sense electrode 103d. Interpolated sense electrodes 103c and 103d are electrically isolated from each by another gap 104a. The patterns of side regions of adjacent sense electrodes may be complimentary in this way, such that the approximately 100% of the area of a side region may be encompassed within adjacent sense electrodes, excepting the area of gaps 104a. In various embodiments, some or all sense electrodes in sense electrode layer 35 may be interpolated with one or more adjacent sense electrodes. In certain embodiments, touch sensor 10 may include any number of sense electrodes suitable for its shape and size.

FIG. 3C illustrates a pattern created by overlaying drive electrode layer 30 with sense electrode layer 35 in touch sensor 10 as illustrated in FIG. 1. Overlaying drive electrodes 102a, 102b, 102c, and 102d with sense electrodes 103a, 103b, 103c, and 103d creates one or more capacitive nodes, for example, capacitive nodes 140a, 140b, and 140c.

Drive electrodes, as illustrated in FIG. 3A, generally run in one direction and are coupled to surface 101a of substrate 101 described in conjunction with FIGS. 1 and 2. Sense electrodes, as illustrated in FIG. 3B, generally run in a direction orthogonal to the drive electrodes and are coupled to side 101b of substrate 101 as described in conjunction with FIGS. 1 and 2. In various embodiments, the drive and sense electrodes can be aligned based on the different shape elements 320 and 321. In the embodiment illustrated in FIG. 3c, drive electrodes and sense electrodes are arranged such that respective side edges 316 and 318 of drive electrode 102a, 102b, 102c, and 102d, are aligned with the ends of shape elements 321 of sense electrode 103a, 103b, 103c, and 103d and respective side edges 317 and 319 of sense electrodes 103a, 103b, 103c, and 103d are aligned with the ends of shape elements 320 of drive electrodes 102a, 102b, 102c, and 102d. Although drive electrodes and sense electrodes do not make electrical contact, they are able to capacitively couple to form capacitive nodes at the points where a drive electrode intersects or overlays a sense electrode.

Capacitive node 140a is created when drive electrode 102d is overlaid with sense electrode 103c. Capacitive node 140a is shaded a light grey and has an area of approximately 12 units, where each unit has an area of width W2 by width W6. Because capacitive node 140a is located near the right hand edge of touch sensor 10, it may be referred to as an edge node in various embodiments. In certain embodiments, along its edges touch sensor 10 may have any number of edge nodes suitable for its shape and size.

Capacitive node 140b is created when drive electrode 102d is overlaid with sense electrode 103d. Capacitive node 140b is shaded a darker grey and has an area of approximately 9 units, where each unit has an area of width W2 by width W6. Because capacitive node 140b is located near the bottom, right corner of touch sensor 10, it may be referred to as a corner node in various embodiments. In embodiments where touch sensor 10 has a generally rectangular shape, touch sensor 10 will have four corner nodes. In certain embodiments, touch sensor 10 may have any number of corner nodes suitable for its shape and size.

Capacitive node 140c is created when drive electrode 102c is overlaid with sense electrode 103c. Capacitive node 140c is shaded darkest grey and has an area of approximately 16 units, where each unit has an area of width W2 by width W6. Because capacitive node 140c is located away from edges and corners of touch sensor 10, it may be referred to as a center node in various embodiments. In various embodiments, nodes in touch sensor 10 located away from edges and corners will each be center nodes. In certain embodiments, touch sensor 10 may have any number of center nodes suitable for its shape and size.

In this conventional layout, capacitive node 140a, the edge node, has an area smaller than capacitive node 140c; capacitive node 140a is approximately 75% of the area of capacitive node 140c. Capacitive node 140b, the corner node, has an area smaller than capacitive nodes 140a and 140c; capacitive node 140b is approximately 56.25% of the area of capacitive node 140c. Conventional techniques may focus on edge performance in linearity and accuracy, and this layout may provide marginally improved linearity and accuracy in performance at the edge of touch sensor 10. Thus, when a user touches at the edge of touch screen 10, he or she may experience a marginally better reporting position. However, contrary to the conventional wisdom, the teachings of the disclosure recognize that this marginal improvement may be traded off for superior total performance of touch screen 10 by ensuring approximately equal areas for each capacitive node, including nodes of each node type: edge nodes, corner nodes, and center nodes. In various embodiments, touch screen controller 12 may require that all nodes have the same unit area to address noise effectively. Additional benefits may arise from modifying the unit areas of each node including improved uniformity in sensitivity and increase signaling capabilities by edge and corner nodes.

Figure 4A:
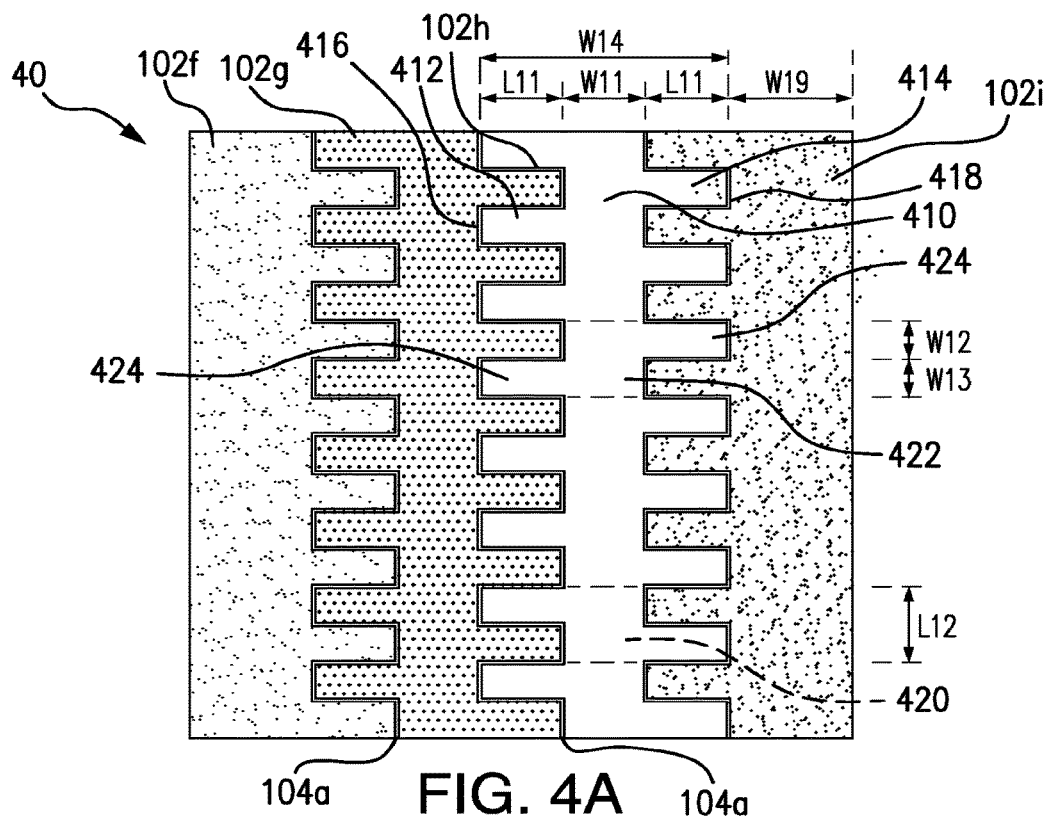
FIGS. 4A, 4B, and 4C illustrate an arrangement of sense and drive electrodes in accordance with particular embodiments of the disclosure.
Figure 4B:
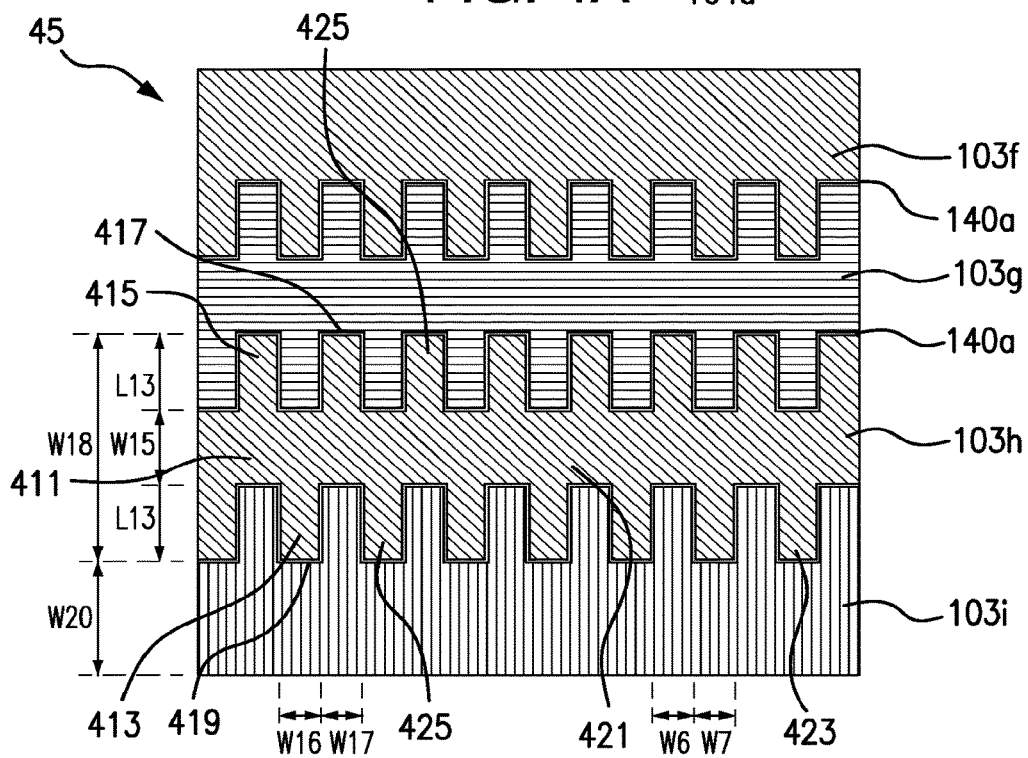
Figure 4C:
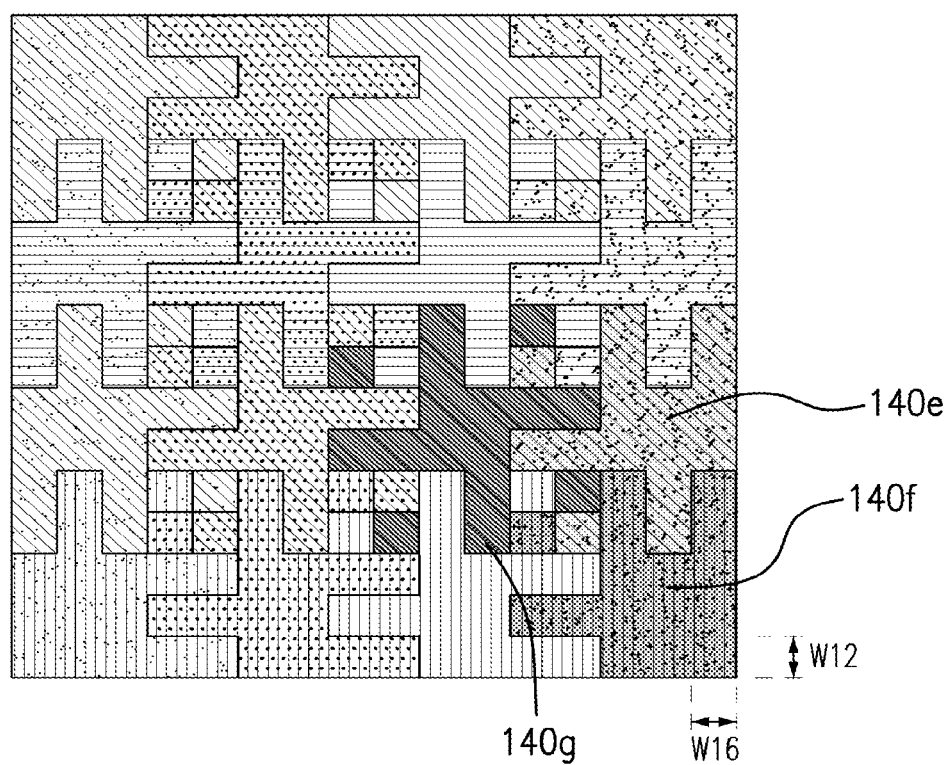

FIGS. 4A, 4B, and 4C illustrate an arrangement of drive electrodes 102 and sense electrodes 103 in accordance with particular embodiments of the disclosure. FIG. 4A illustrates a drive electrode layer 40 with a particular pattern of drive electrodes that could be used in touch sensor 10 as illustrated in FIG. 1. Drive electrode layer 40 includes drive electrodes 102f, 102g, 102h, and 102i.

Drive electrode 102h comprises a center region 410, two side regions 412 and 414, two outer boundaries 416 and 418, a repeating shape element 420, and a plurality of rectangular arms 424. Side region 412 runs along one side of center region 410 and side region 414 runs along the opposite side of center region 410. Both run parallel to each other and center region 410.

Each side region 412 and 414 have rectangular arms 424 extending from center region 410 with a length L11. Length L11 is approximately equal to a width W11 of center region 410 of drive electrode 102h. Each rectangular arm 424 is separated from an adjacent rectangular arm 424 in side regions 412 and 414, respectively, by a rectangular space. In this embodiment, a width W12 of each rectangular arm 424 is approximately the same as a width W13 of each rectangular space, such that approximately half of the total area of each side region 412 and 414 is encompassed within the area of drive electrode 102h. Rectangular arms 424 are formed in an alternating fashion such that a rectangular arm in side region 412 is not in the same row as a rectangular arm is side region 414. In certain embodiments, rectangular arms 424 may be formed such that a rectangular arm in side region 412 is in the same row as a rectangular arm in side region 414. In particular embodiments, arms 424 may be rectangular, square, have curved edges, or may be of any suitable shape. In various embodiments, a rectangular arm may be referred to as a digit.

The shape of drive electrode 102h is made up of a plurality of repeated shape elements 420. Each shape element 420 has one conductive rectangular arm 424 in each side region 412 and 414 and these rectangular arms 424 are linked by a section of center region 410. The ends of a single shape element 420 are illustrated by dashed lines in FIG. 4A. Each shape element 420 has a length L12, which is approximately equal to twice the width of a rectangular arm 424, or approximately twice width W12. The length L12 is the repeat length of the drive electrode pattern. Each shape element 420 has a width W14, which is approximately equal to the total width of center region 410 and both side regions 412 and 414, or approximately thrice length L11 or thrice width W11. Width W14 is approximately equal to the distance between edges 416 and 418 of drive electrode 102h. In this embodiment, drive electrode 102h includes eight repeating shape elements 420. In certain embodiments, drive electrode 102h may be formed by repeating shape elements 422, which are opposite handed compared to shape elements 420. Drive electrode 102g includes shapes similar to drive electrode 102h with similar dimensions.

Drive electrode 102i is on the right hand side drive electrode layer 40. Drive electrode 102i also has similar shapes and similar dimensions to drive electrodes 102g and 102h in side region 412. Drive electrode 102i has a center region 410 with a width W19; W11 of center regions 410 of drive electrodes 102g and 102h is approximately two-thirds of W19. Drive electrode 102i does not have a side region 314 with rectangular arms. Drive electrode 102f includes shapes similar to drive electrode 102i with an opposite handed orientation. Drive electrode 102f is on the left hand side of drive layer 40. Drive electrode 102f has similar shapes and similar dimensions to drive electrodes 102g and 102h in side region 414. Drive electrode 102f does not have side region 412. Similar to drive electrode 102i, drive electrode 102f has a center region 410 with a width W19. In certain embodiments, drive electrodes located near edges of touch sensor 10 may have any suitable center region width to ensure edge and corner capacitive nodes have approximately equal areas to center nodes. In various embodiments, drive electrodes located near edges of touch sensor 10 may only include one side region and may have any suitable dimensions to allow for edge nodes, corner nodes, and center nodes with approximately areas.

Rectangular arms 424 in side region 412 of drive electrode 102h are interpolated with rectangular arms of drive electrode 102g, such that space between rectangular arms 424 in side region 412 is generally filled by rectangular arms of drive electrode 102g. Interpolated drive electrodes 102g and 102h are electrically isolated from each other by one of a plurality of gaps 104a, where each gap 104a is a cut in the lines of conductive material, such as copper, that comprise drive electrodes 102f, 102g, 102h, and 102i. Rectangular arms 424 in side region 414 of drive electrode 102h are interpolated with rectangular arms of drive electrode 102i, such that space between rectangular arms 424 in side region 414 is generally filled by rectangular arms of drive electrode 102i. Interpolated drive electrodes 102h and 102i are electrically isolated from each by another gap 104a. The patterns of side regions of adjacent drive electrodes may be complimentary in this way, such that the approximately 100% of the area of a side region may be encompassed within adjacent drive electrodes, excepting the area of gaps 104a. In various embodiments, some or all drive electrodes in drive electrode layer 40 may be interpolated with one or more adjacent drive electrodes. In certain embodiments, touch sensor 10 may include any suitable number of drive electrodes for its shape and size. Drive electrodes in various embodiments may be any suitable length and width and the length and/or width of drive electrodes within a particular touch sensor may vary.

FIG. 4B illustrates a sense electrode layer 45 with a particular pattern of sense electrodes that could be used in touch sensor 10 as illustrated in FIG. 1. Sense electrode layer 45 includes sense electrodes 103f, 103g, 103h, and 103i.

Sense electrode 103h comprises a center region 411, two side regions 413 and 415, two outer boundaries 417 and 419, a repeating shape element 421, and a plurality of rectangular arms 425. Side region 413 runs along one side of center region 411 and side region 415 runs along the opposite side of center region 411. Both run parallel to each other and center region 411.

Each side region 413 and 415 have rectangular arms 425 extending from center region 411 with a length L13. Length L13 is approximately equal to a width W15 of center region 411 of sense electrode 103h. In various embodiments, W15 may be approximately equal to W11 of drive electrode 102h. Each rectangular arm 425 is separated from an adjacent rectangular arm 425 in side regions 413 and 415, respectively, by a rectangular space. In this embodiment, a width W16 of each rectangular arm 425 is approximately the same as a width W17 of each rectangular space, such that approximately half of the total area of each side region 413 and 415 is encompassed within the area of sense electrode 103h. In various embodiments, width W16 may be approximately equal to width W12 of each rectangular arm 424 of drive electrode 102h. Rectangular arms 425 are formed in an alternating fashion such that a rectangular arm in side region 413 is not in the same row as a rectangular arm is side region 415. In certain embodiments, rectangular arms 425 may be formed such that a rectangular arm in side region 413 is in the same row as a rectangular arm in side region 415. In particular embodiments, arms 425 may be rectangular, square, have curved edges, or may be of any suitable shape. In various embodiments, a rectangular arm may be referred to as a digit.

The shape of sense electrode 103h is made up of a plurality of repeated shape elements 421. Each shape element 421 has one conductive rectangular arm 425 in each side region 413 and 415 and these rectangular arms 425 are linked by a section of center region 411. The ends of a single shape element 421 are illustrated by dashed lines in FIG. 4B. Each shape element 421 has a length L14, which is approximately equal to twice the width of a rectangular arm 425, or approximately twice width W16. The length L14 is the repeat length of the sense electrode pattern. Each shape element 421 has a width W18, which is approximately equal to the total width of center region 411 and both side regions 413 and 415, or approximately thrice length L13 or thrice width W15. Width W18 is approximately equal to the distance between edges 417 and 419 of sense electrode 103h. In this embodiment, sense electrode 103h includes eight repeating shape elements 421 in sense electrode layer 45. In certain embodiments, sense electrode 103h may be formed by repeating shape elements 423, which are opposite handed compared to shape elements 421. Sense electrode 103g includes shapes similar to sense electrode 103h with similar dimensions. Sense electrode 103i is on the bottom side of sense layer 45. Sense electrode 103i also has similar shapes and similar dimensions to sense electrodes 103g and 103h in side region 413. Sense electrode 103i has a center region 411 with a width W20; W18 of sense electrodes 103g and 103h is approximately two-thirds of width W18. In various embodiments, width W20 is approximately equal to W19 of drive electrode 102i. Sense electrode 103i does not have a side region 413 with rectangular arms. Sense electrode 103f includes shapes similar to sense electrode 103i with an opposite handed orientation. Sense electrode 103f is on the top side of sense electrode layer 45. Sense electrode 103f has similar shapes and similar dimensions to sense electrodes 103g and 103h in side region 413. Sense electrode 103f does not have a side region 415. Similar to sense electrode 103i, sense electrode 103f has a center region 411 with a width W20. In certain embodiments, sense electrodes located near edges of touch sensor 10 may have any suitable center region width to ensure edge and corner capacitive nodes have approximately equal areas to center nodes. Sense electrode 102i does not have a side region 315 with rectangular arms. In various embodiments, drive electrodes located near edges of touch sensor 10 may only include one side region and may have any suitable dimensions to allow for edge nodes, corner nodes, and center nodes with approximately areas.

Rectangular arms 425 in side region 413 of sense electrode 103h are interpolated with rectangular arms of sense electrode 103g, such that space between rectangular arms 425 in side region 413 is generally filled by rectangular arms of sense electrode 103g. Interpolated sense electrodes 103g and 103h are electrically isolated from each other by one of a plurality of gaps 104a, where each gap 104a is a cut in the lines of conductive material, such as copper, that comprise sense electrodes 103f, 103g, 103h, and 103i. Rectangular arms 425 in side region 415 of sense electrode 103h are interpolated with rectangular arms of sense electrode 103i, such that space between rectangular arms 425 in side region 415 is generally filled by rectangular arms of sense electrode 103i. Interpolated sense electrodes 103h and 103i are electrically isolated from each by another gap 104a. The patterns of side regions of adjacent sense electrodes may be complimentary in this way, such that the approximately 100% of the area of a side region may be encompassed within the adjacent sense electrodes, excepting the area of gaps 104a. In various embodiments, some or all sense electrodes in sense electrode layer 45 may be interpolated with one or more adjacent sense electrodes. In certain embodiments, touch sensor 10 may include any number of sense electrodes suitable for its shape and size.

FIG. 4C illustrates a pattern created by overlaying drive electrode layer 40 with sense electrode layer 45 that could be used in touch sensor 10 in FIG. 1. Overlaying drive electrodes 102f, 102g, 102h, and 102i with sense electrodes 103f, 103g, 103h, and 103i creates one or more capacitive nodes, for example, capacitive nodes 140e, 140f, and 140g.

Drive electrodes, as illustrated in FIG. 4A, generally run in one direction and are coupled to surface 101*a* of substrate 101 described in conjunction with FIGS. 1 and 2. Sense electrodes, as illustrated in FIG. 4B, generally run in a direction orthogonal to the drive electrodes and are coupled to side 101*b* of substrate 101 as described in conjunction with FIGS. 1 and 2. In various embodiments, the drive and sense electrodes can be aligned based on the different shape elements 420 and 421. In the embodiment illustrated in FIG. 4C, drive electrodes and sense electrodes are arranged such that respective side edges 416 and 418 of drive electrodes 102*f,* 102*g,* 102*h* and 102*i* are aligned with the ends of shape elements 421 of sense electrodes 103*f,* 103*g,* 103*h,* and 103*i,* and respective side edges 417 and 419 of sense electrodes 103*f,* 103*g,* 103*h,* and 103*i* are aligned with the ends of shape elements 420 of drive electrodes 102*f,* 102*g,* 102*h,* and 102*i*. Although drive electrodes and sense electrodes do not make electrical contact, they are able to capacitively couple to form capacitive nodes at the points where a drive electrode intersects or overlays a sense electrode.

Capacitive node 140*e* is created when drive electrode 102*i* is overlaid with sense electrode 103*h*. Capacitive node 140*e* is shaded a light grey and has an area of approximately 16 units, where each unit has an area of width W12 by width W16. Because capacitive node 140*e* is located near the right hand edge of touch sensor 10, it may be referred to as an edge node in various embodiments. In certain embodiments, along its edges, touch sensor 10 may have any number of edge nodes suitable for its shape and size.

Capacitive node 140*f* is created when drive electrode 102*i* is overlaid with sense electrode 103*i*. Capacitive node 140*b* is shaded a darker grey and has an area of approximately 16 units, where each unit has an area of width W12 by width W16. Because capacitive node 140*f* is located near the bottom, right corner of touch sensor 10, it may be referred to as a corner node in various embodiments. In embodiments where touch sensor 10 has a generally rectangular shape, touch sensor 10 will have four corner nodes. In certain embodiments, touch sensor 10 may have any number of corner nodes suitable for its shape and size.

Capacitive node 140*g* is created when drive electrode 102*h* is overlaid with sense electrode 103*h*. Capacitive node 140*g* is shaded darkest grey and has an area of approximately 16 units, where each unit has an area of width W12 by width W16. Because capacitive node 140*g* is located away from edges and corners of touch sensor 10, it may be referred to as a center node in various embodiments. In various embodiments, nodes in touch sensor 10 located away from edges and corners will each be center nodes. In certain embodiments, touch sensor 10 may have any number of center nodes suitable for its shape and size.

With each node having an area of 16 units, capacitive nodes 140*e,* 140*f,* and 140*g* each have approximately equal areas. In various embodiments, drive and sense electrodes may be configured such that capacitive nodes 140*e,* 140*f,* and 140*g* each have approximately equal unit areas, which measure greater or fewer than 16 units. In certain embodiments, nodes with approximately equal areas may include nodes that each have a unit area that varies from each other node between 0% and 10%, and in particular, between 1% and 5%. In various embodiments, nodes with approximately equal areas may include nodes that each have a unit area that varies from each other node by up to 10%. In particular embodiments, nodes with approximately equal areas may include nodes that each have a unit area that varies from each other node by up to 1%. Creating a pattern that allows for equal areas for each node type, including edge, corner, and center nodes, requires a different cut in the conductive mesh than is required in the conventional approach discussed in conjunction with FIGS. 3A and 3B. For example, within touch screen 10 of FIG. 1, the conductive mesh is cut in FIGS. 4A and 4B such that there are two additional rectangular arms 424 illustrated for drive electrode 102*h* and sense electrode 103*h* than rectangular arms 324 illustrated for drive electrode 102*c* and sense electrode 102*c* in FIGS. 3A and 3B. Additionally, the cut in FIGS. 4A and 4B allows for wider center region 410 for drive electrode 102*i* in comparison to drive electrodes 102*g* and 102*h* and wider center region 410 for sense electrode 103*i* in comparison to sense electrode 103*g* and 103*h*. In various embodiments, drive and sense electrodes 102 and 103 may be any suitable size and comprise any suitable pattern than allows for edge nodes, corner nodes, and center nodes of approximately equal areas. In certain embodiments, cuts in the lines of conductive material comprising drive electrodes 102 may be similar to cuts in the lines of conductive material comprising sense electrodes 103. In particular embodiments, there may be variation in the size and shape of the rectangular arms or digits of drive electrodes 102 and/or sense electrodes 103 so long as the pattern created when drive electrodes 102 are overlaid with sense electrodes 103 creates edge nodes, corner nodes, and center nodes of approximately equal areas.

Technical advantages associated with edge nodes, corner nodes, and center nodes of approximately equal areas may include improved ability of touch screen controller 12 to address noise. Advantages may additionally or alternatively include an improvement in the uniformity of sensitivity across touch sensor 10. Further advantages may additionally or alternatively include increased signal size from edge and corner nodes.

Although this disclosure illustrates several configurations of touch sensor 10, these illustrations are not necessarily drawn to scale. Certain features have been exaggerated or enlarged for descriptive purposes. For example, in particular illustrations, the drive and sense electrodes may be enlarged in comparison to other components of touch screen 10 or in comparison to touch screen 10 itself.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch position-sensing panel comprising:
a sensing area comprising:
a substrate;
a plurality of first electrodes in a first layer, the plurality of first electrodes arranged in a first direction, wherein:
a first electrode of the plurality of first electrodes comprises a first center region;
a second electrode of the plurality of first electrodes comprises a second center region, the second electrode of the plurality of first electrodes not including material of the first electrode of the plurality of first electrodes, the second center region being rectangular in shape; and
a width of the second center region of the second electrode of the plurality of first electrodes is less than a width of the first center region of the first electrode of the plurality of first electrodes, wherein the width of the second center region is approximately equal to and spans a distance between edges of the second electrode;
a plurality of second electrodes in a second layer, the plurality of second electrodes arranged in a second direction; and
a plurality of capacitive nodes formed by a capacitive coupling of the plurality of first electrodes in the first layer and the plurality of second electrodes in the second layer.

2. The touch position-sensing panel of claim 1, wherein the plurality of first electrodes in the first layer are on a first side of the substrate and the plurality of second electrodes in the second layer are on a second side of the substrate.

3. The touch position-sensing panel of claim 1, wherein the first direction is generally perpendicular to the second direction.

4. The touch position-sensing panel of claim 1, wherein at least one electrode of the plurality of first electrodes and at least one electrode of the plurality of second electrodes each have an outer boundary comprising a repeating pattern.

5. The touch position-sensing panel of claim 4, wherein the repeating pattern creates a first plurality of arms of the at least one electrode of the plurality of first electrodes and a second plurality of arms of the at least one electrode of the plurality of second electrodes.

6. The touch position-sensing panel of claim 1, wherein the second electrode of the plurality of first electrodes comprises a plurality of arms with a first portion and a second portion, the first portion of the plurality of arms located on a first side of the second center region of the second electrode and the second portion of the plurality of arms located on a second side of the second center region of the second electrode, such that each arm in the first portion shares a row with an arm in the second portion.

7. The touch position-sensing panel of claim 1, wherein:
the first electrode comprises a first plurality of arms, the first plurality of arms on one side of the first center region of the first electrode and each of the first plurality of arms being separated from another one of the first plurality of arms by a space of a first plurality of spaces;
the second electrode comprises a second plurality of arms, the second plurality of arms on one side of the second center region of the second electrode and each of the second plurality of arms being separated from another one of the second plurality of arms by a space of a second plurality of spaces; and
wherein the first plurality of arms and the second plurality of arms are interpolated, such that a portion of each of the second plurality of spaces are occupied by a portion of the first plurality of arms and a portion of each of the first plurality of spaces are occupied by a portion of the second plurality of arms.

8. The touch position-sensing panel of claim 7, wherein an area of at least one arm of the first plurality of arms is approximately equal to an area of at least one arm of the second plurality of arms.

9. The touch position-sensing panel of claim 1, wherein:
the second electrode of the plurality of first electrodes comprises a first plurality of arms with a first portion and a second portion, the first portion of the first plurality of arms located on one side of the second center region of the second electrode of the plurality of first electrodes and the second portion of the first plurality of arms located on an opposing side of the second center region of the second electrode of the plurality of first electrodes; and
at least one electrode of the plurality of second electrodes comprises a second plurality of arms with a first portion and a second portion, the first portion of the second plurality of arms is located on one side of the at least one electrode and the second portion of the second plurality of arms located on an opposing side of the at least one electrode of the plurality of second electrodes.

10. The touch position-sensing panel of claim 1, wherein:
the plurality of first electrodes in the first layer has a first plurality of gaps formed therein, a gap of the first plurality of gaps separating the first electrode of the plurality of first electrodes from the second electrode of the plurality of first electrodes; and
the plurality of second electrodes in the second layer has a second plurality of gaps formed therein, a gap of the second plurality of gaps separating a first electrode of the plurality of second electrodes from an adjacent electrode of the plurality of second electrodes.

11. The touch position-sensing panel of claim 1, wherein the plurality of capacitive nodes comprises at least one center node, at least one edge node, and at least one corner node each having an area that varies from each other node between 0% and 10%.

12. A device comprising:
a touch position-sensing panel comprising:
a sensing area comprising:
a substrate;
a plurality of first electrodes in a first layer, the plurality of first electrodes arranged in a first direction, wherein:
a first electrode of the plurality of first electrodes comprises a first center region;
a second electrode of the plurality of first electrodes comprises a second center region, the second center region being rectangular in shape, the second electrode of the plurality of first electrodes not including material of the first electrode of the plurality of first electrodes; and
a width of the second center region of the second electrode of the plurality of first electrodes is less than a width of the first center region of the first electrode of the plurality of first electrodes, wherein the width of the second center region is approximately equal to and spans a distance between edges of the second electrode;

a plurality of second electrodes in a second layer, the plurality of second electrodes arranged in a second direction; and a plurality of capacitive nodes formed by a capacitive coupling of the plurality of first electrodes in the first layer and the plurality of second electrodes in the second layer; and a controller embodying logic that is configured when executed to control the touch position-sensing panel.

13. The device of claim 12, wherein the plurality of first electrodes in the first layer are on a first side of the substrate and the plurality of second electrodes in the second layer are on a second side of the substrate.

14. The device of claim 12, wherein the first direction is generally perpendicular to the second direction.

15. The device of claim 12, wherein at least one electrode of the plurality of first electrodes and at least one electrode of the plurality of second electrodes each have an outer boundary comprising a repeating pattern.

16. The device of claim 15, wherein the repeating pattern creates a first plurality of arms of the at least one electrode of the plurality of first electrodes and a second plurality of arms of the at least one electrode of the plurality of second electrodes.

17. The device of claim 12, wherein the second electrode of the plurality of first electrodes comprises a plurality of arms with a first portion and a second portion, the first portion of the plurality of arms located on a first side of the second center region of the second electrode and the second portion of the plurality of arms located on a second side of the second center region of the second electrode, such that each arm in the first portion shares a row with an arm in the second portion.

18. The device of claim 12, wherein:

the first electrode comprises a first plurality of arms, the first plurality of arms on one side of the first center region of the first electrode and each of the first plurality of arms being separated from another one of the first plurality of arms by a space of a first plurality of spaces;

the second electrode comprises a second plurality of arms, the second plurality of arms on one side of the second center region of the second electrode and each of the second plurality of arms being separated from another one of the second plurality of arms by a space of a second plurality of spaces; and wherein the first plurality of arms and the second plurality of arms are interpolated, such that a portion of each of the second plurality of spaces are occupied by a portion of the first plurality of arms and a portion of each of the first plurality of spaces are occupied by a portion of the second plurality of arms.

19. The device of claim 18, wherein an area of at least one arm of the first plurality of arms is approximately equal to an area of at least one arm of the second plurality of arms.

20. The device of claim 12, wherein:

the second electrode of the plurality of first electrodes comprises a first plurality of arms with a first portion and a second portion, the first portion of the first plurality of arms located on one side of the second center region of the second electrode of the plurality of first electrodes and the second portion of the first plurality of arms located on an opposing side of the second center region of the second electrode of the plurality of first electrodes; and at least one electrode of the plurality of second electrodes comprises a second plurality of arms with a first portion and a second portion, the first portion of the second plurality of arms is located on one side of the at least one electrode and the second portion of the second plurality of arms located on an opposing side of the at least one electrode of the plurality of second electrodes.

21. The device of claim 12, wherein:

the plurality of first electrodes in the first layer has a first plurality of gaps formed therein, a gap of the first plurality of gaps separating the first electrode of the plurality of first electrodes from the second electrode of the plurality of first electrodes; and the plurality of second electrodes in the second layer has a second plurality of gaps formed therein, a gap of the second plurality of gaps separating a first electrode of the plurality of second electrodes from an adjacent electrode of the plurality of second electrodes.

22. The device of claim 12, wherein the plurality of capacitive nodes comprises at least one center node, at least one edge node, and at least one corner node each having an area that varies from each other node between 0% and 10%.

* * * * *